US012759762B2

(12) United States Patent
Donnelly

(10) Patent No.: US 12,759,762 B2
(45) Date of Patent: Oct. 13, 2026

(54) PACKAGE COMPRISING INTEGRATED NOTE FEATURE

(71) Applicant: David Donnelly, Plano, TX (US)

(72) Inventor: David Donnelly, Plano, TX (US)

( * ) Notice: Subject to any disclaimer, the term of this patent is extended or adjusted under 35 U.S.C. 154(b) by 0 days.

(21) Appl. No.: 18/638,349

(22) Filed: Apr. 17, 2024

(65) Prior Publication Data

US 2024/0351748 A1 Oct. 24, 2024

Related U.S. Application Data

(60) Provisional application No. 63/460,142, filed on Apr. 18, 2023.

(51) Int. Cl.

*B65D 33/00* (2006.01)
*B65D 65/38* (2006.01)
*G09F 3/02* (2006.01)

(52) U.S. Cl.

CPC ........... *B65D 33/004* (2013.01); *B65D 65/38* (2013.01); *G09F 3/02* (2013.01); *B65D 2203/00* (2013.01)

(58) Field of Classification Search

CPC .. B65D 33/004; B65D 65/38; B65D 2203/00; B65D 5/4216; B65D 5/4229; B65D 5/4233; B65D 23/14
USPC ........................................... 206/459.1, 459.5
See application file for complete search history.

(56) References Cited

U.S. PATENT DOCUMENTS 2,868,363 A * 1/1959 Legnaioli ........... B65D 85/1081 206/459.5
6,041,929 A * 3/2000 Brunner .................... B32B 7/05 383/111
7,686,513 B2 * 3/2010 Knoerzer ............... B65D 75/26 383/111
7,926,702 B2 * 4/2011 Childs .................... B65D 29/00 383/105
8,387,346 B1 * 3/2013 Coates .................... B65B 67/08 53/449
8,603,278 B2 * 12/2013 Moore ...................... B65C 3/06 156/219
2002/0190115 A1 * 12/2002 Schuren ................... B65D 3/06 206/459.5
2006/0249950 A1 * 11/2006 Kenney .................. B42D 25/29 283/81
2007/0034545 A1 * 2/2007 Sabalaskey ............ G09B 11/00 229/87.01
2007/0175774 A1 * 8/2007 Smart ...................... A45C 3/00 206/459.5
2009/0172990 A1 * 7/2009 Corey ....................... G09F 3/02 40/675
2009/0266735 A1 * 10/2009 Moore ............... B65D 23/0842 283/81
2012/0138563 A1 * 6/2012 Brumfield ............. B65D 51/18 215/230
2012/0152783 A1 * 6/2012 Cheema ............... B65D 75/545 53/473

(Continued)

*Primary Examiner* — Steven A. Reynolds
(74) *Attorney, Agent, or Firm* — Ashley D. Johnson; Dogwood Patent and Trademark Law

(57) ABSTRACT

The invention is directed to a food package that includes a writing section that is dedicated to receiving a written message. Specifically, the package writing section allows a user to easily customize a message to a recipient by writing or drawing directly within the section. In this way, the user ensures that the message is seen by the recipient when accessing the package.

20 Claims, 7 Drawing Sheets

(56) References Cited

U.S. PATENT DOCUMENTS

2014/0113272 A1* 4/2014 Schefke .................. B65D 1/40
434/408
2020/0105164 A1* 4/2020 Coelho .................... G09F 3/02

* cited by examiner

PACKAGE COMPRISING INTEGRATED NOTE FEATURE

CROSS-REFERENCE TO RELATED APPLICATIONS

This application claims priority to U.S. Provisional Patent Application No. 63/460,142 filed Apr. 18, 2023, the entire content of which is incorporated by reference herein.

FIELD OF THE INVENTION

The presently disclosed subject matter is directed to a package that includes an integrated portion or section of material that allows a user to write a note or message directly on the exterior of the packaging film. The presently disclosed subject matter also includes methods of making and using the packaging film and associated packages.

BACKGROUND OF THE INVENTION

It is known to package food products in a flexible wrapper that is folded or sealed to encase the food product (e.g., a chocolate bar) or to create a package into which food products are deposited (e.g., potato chips). To protect the food product, the wrapper is typically constructed from a substantially gas and moisture impervious material, such as a metal foil, plastic, or combinations of the two to provide a hermetically sealed container. Packaged food products are often given as gifts on special occasions or as a thank you present. In addition, packaged food products are frequently provided in the lunchboxes of children, to be eaten while at school or on the go. However, current packaging is not amenable if a parent or gift giver wishes to write a message directly on the food package, such as birthday wishes or other personal messages. Further, there is often not a suitable amount of blank space available on food packages to allow a user to write a message. To overcome this problem, a user must write a message on a card that can be attached to the food package with tape or other conventional adhesive. However, providing a separate note to attach to the package is not particularly convenient as it requires the giver to buy or make a card and find a way of attaching it to the food package. In addition, the note card can also easily become dislodged from the food package and be lost. Further, attaching a note via adhesive or tape often leads to an unattractive appearance due to lack of uniformity and/or lack of alignment with the contours or edges of the packaging. It would therefore be beneficial to provide a package that includes a dedicated blank area region or section of material configured to allow a person to write a message directly on the packaging film.

SUMMARY OF THE INVENTION

In some embodiments, the presently disclosed subject matter is directed to a package comprising a front face and an opposed rear face, and an interior configured to house one or more packaged products. The package includes a writing section positioned on at least one of the front face, rear face, top face, bottom face, or side face of the package, wherein the writing section configured to allow a user to write or draw within the writing section and directly on the package. The writing section is configured as a portion of packaging film used to construct the package.

In some embodiments, the package further includes an aperture with an additional writing section adhered over the aperture.

In some embodiments, the writing section is removable from the package.

In some embodiments, the package includes a removable covering positioned over the writing section.

In some embodiments, the writing section includes a line of weakness around a perimeter of the writing section, allowing it to be removed from the remainder of the package.

In some embodiments, the presently disclosed subject matter is directed to a method of providing a customized message within a writing section of a package. Particularly, the method comprises writing a desired message within the writing section of the disclosed package. The method also includes delivering the package to an intended user, thereby providing a customized message to the intended user on the package.

In some embodiments,

In some embodiments, the message is customized by a user.

In some embodiments, the writing section includes a blank area that is customized by a user.

In some embodiments, the writing section includes a pre-written portion that is further customized by a user. For example, the section can include a pre-written message (e.g., Happy Birthday) that can further be added to by a user.

In some embodiments, the packaged product is a food product selected from snack food, chips, cookies, crackers, popcorn, pretzels, cereal cups, candy, chocolate, bar, nuts, fruit, cereal, and combinations thereof.

In some embodiments, the package is a bag, pouch, cup, bottle, tube, snack cup, carton, or combinations thereof.

In some embodiments, the package is a single-serve and/or multi-serve package. A “single serve” package refers to a package with an amount of packaged product suitable for a single use. For example, a single portion of potato chips. A “multi-serve” package is configured to allow for multiple uses (e.g., a large potato chip bag that houses several servings of potato chips).

In some embodiments, the package material is constructed from metal foil, polymeric material, or combinations thereof. “Metal foil” refers to a metal with malleability and ductility for formation of foil. Examples of the aforementioned metal or alloy material include but are not limited to stainless steel, copper, aluminum, zinc, iron, nickel, gold, silver, transition metals, and alloy materials of two or more of the aforementioned metal. The term “polymeric” refers to a material which is the product of a polymerization reaction of natural, synthetic, or natural and synthetic ingredients, and is inclusive of homopolymers, copolymers, terpolymers, etc. In general, the layers of a film or substrate may comprise a single polymer, a mixture of a single polymer and non-polymeric materials, a combination of two or more polymeric materials blended together, or a mixture of a blend of two or more polymeric materials and non-polymeric materials.

In some embodiments, the writing section is constructed from paper, cardboard, fiberboard, carton board, chalk board, white board, polymer-based materials, or combinations thereof.

In some embodiments, the packaging materials are constructed from food safe materials. The term “food safe” refers to compositions that are comprised entirely of materials that are considered food grade, and/or Generally Recognized As Safe (GRAS) and/or Everything Added to Food in the U.S. (EAFUS). In the United States, ingredients pre-approved for food use are listed in the United States Code of Federal Regulations ("C. F. R."), Title 21, incorporated herein by reference. Food safe materials may also include ingredients that are well established as safe, have adequate toxicological and safety pedigree, can be added to existing lists, or approved via a self-affirmation process.

In some embodiments, the writing section is permanently attached to the package. For example, the writing section is prepared as part of the film package and cannot be removed without the use of scissors, a knife, or other cutting utensil.

In some embodiments, the writing section has length, width, or both of about 1-25 inches.

In some embodiments, the package comprises one or more writing sections.

In some embodiments, the writing section is configured in the shape of a square, rectangle, circle, oval, star, triangle, heart-shape, cross shape, pentagon, hexagon, octagon, characters, animals; or combinations thereof.

DETAILED DESCRIPTION OF THE INVENTION

Figure 1:
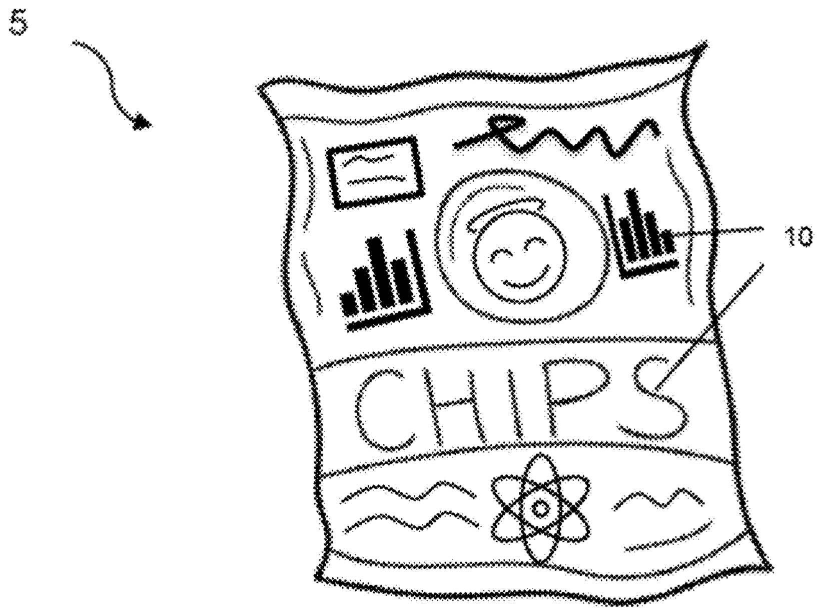
PRIOR ART Fig. 1
FIG. 1 is a front plan view of a prior art package in accordance with some embodiments of the presently disclosed subject matter.

For the purpose of promoting an understanding of the principles of the present disclosure, reference will now be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e., at least one) of the grammatical object of the article. By way of example, "an element" means at least one element and can include more than one element. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise indicated, all numbers expressing quantities of components, conditions, and so forth used in the specification and claims are to be understood as being modified in all instances by the term "about." Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the disclosed packages and methods. Thus, the term "about" is used to provide flexibility to a numerical range endpoint by providing that a given value may be "slightly above" or "slightly below" the endpoint without affecting the desired result.

As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the drawing figures. It will be understood that these terms and those discussed above are intended to encompass different orientations of the device in addition to the orientation depicted in the drawing figures.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

All methods described herein can be performed in any suitable order unless otherwise indicated herein or otherwise clearly contradicted by context. The use of any and all examples, or exemplary language (e.g., "such as") provided herein, is intended merely to better illuminate the invention, and does not pose a limitation on the scope of the invention unless otherwise claimed. No language in the specification should be construed as indicating any unclaimed element as essential to the practice of the invention.

Unless otherwise defined, all technical terms used herein have the same meaning as commonly understood by one of ordinary skill in the art to which this disclosure belongs.

FIG. 1 illustrates a prior art food package 5. As shown, the package includes significant amounts of manufacturer writing or imagery 10 on the entire package surface, including artwork, ingredients, taglines, logos, manufacturing information, expiration dates, and the like. The term "manufacturer writing" therefore includes any artwork, trademarks, ingredient lists, expiration dates, images, phone numbers, etc. In this way, manufacturers can easily attract customers to purchase the food product. The writing and imagery also provides information to purchasers about the contents of the package. However, with conventional prior art packaging, there often is insufficient space for a user to write a message on the package exterior surface. In addition, prior art packaging materials themselves do not allow a user to effectively write directly on the packaging material (e.g., the ink does not adhere to the surface). When a user can find space, messages are often written on the package itself. For instance, a package such as a food package or box is simply customized by writing on the exterior surface of the package with a pen or marker. However, the ink may subsequently smear or rub off during the process of delivery and transport. Further, the material of the package may not allow for adequate adherence of the ink so the message is unreadable. Also, if the writing is not in a designated area or space, the intended recipient of the message may not see it since the package includes imagery and writing as noted above.

Figure 2:
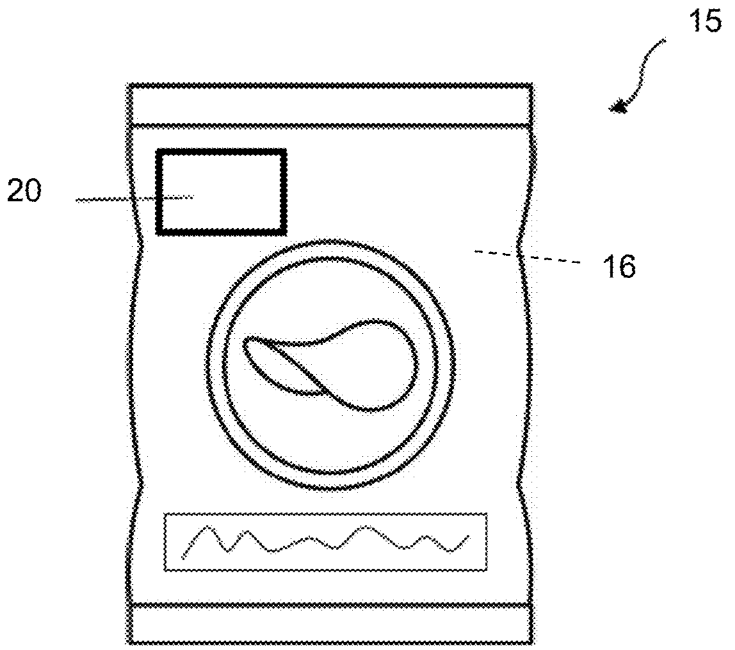
FIG. 2 is a front plan view of a package comprising a writing section in accordance with some embodiments of the presently disclosed subject matter.

The presently disclosed subject matter is directed to package 15 that includes writing section 20 that is dedicated to receiving a written message, as illustrated in FIG. 2. The writing section is externally accessible and dimensioned to allow a user to write a desired message or draw an intended drawing. As discussed in detail below, writing section 20 allows a user to easily customize a message to a recipient by writing or drawing directly within the dedicated section. In this way, the user ensures that the message is seen by the recipient when accessing the package and cannot become misplaced or otherwise lost.

The term "package" as used herein broadly refers to any device used to surround a product wholly or partially. Thus, suitable packages can include (but are not limited to) bags, pouches, cups, flat product packaging, wrapped product packaging, cartons, bottles, tubes, pumps, and the like. Any container can be used. In some embodiments, package 15 can be a food package. A "food package" includes one or more food products housed within the interior of the package. However, package 15 is not limited and includes interior 16 that can be used to house any desired item, such as (but not limited to) one or more school items (e.g., note cards, pencils, erasers), office supplies (e.g., pens, stationary), household items (e.g., matches, clothespins), or any item that be housed within a package as defined herein. Thus, it should be appreciated that the item to be housed within package 15 is not limited. The shape and construction of package 15 is largely functional, with the intention of providing a closed and often sealed package to protect the contents. Any visual attractiveness is generally provided by the design printed on the outside of the wrapper.

The term "food product" as used herein thus can include any edible product. For example, suitable food products can include (but are not limited to) snack foods (e.g., corn chips, pita chips, potato chips), candy, chocolate, bars (e.g., cereal bars, candy bars, granola bars, protein bars), nuts, fruits (e.g., dried apples, prunes, raisins, applesauce), cereal, crackers, popcorn, and the like. Any edible product that can be safely and securely housed within a package is therefore included under the term "food product."

In some embodiments, package 15 can be used to distribute single-serve and/or multi-serve food products distributed to consumer outlets such as grocery stores and other food service establishments. It will be appreciated that consumers in such outlets often have a greater opportunity to view messages while they wait for and consume food, such as in line while waiting to order food. It is expected, therefore, that the view rates for messages distributed via the novel packages and methods as set forth herein will be significantly greater than view rates for other types of packages.

The disclosed food package can be constructed from any suitable material, such as metal foil, polymeric material, paper, cardboard, and/or combinations thereof. In some instances, the packaging material is considered food safe (e.g., complies with the relevant legal requirements for food contact materials). For example, in some embodiments, package 15 includes an inner and outer web. The inner layer may be a single layer of material or can be of laminated construction. For example, the inner layer can be a laminate of a metal foil (e.g., aluminum foil) on one side and a plastics material on the other side. When the material is formed into the package, the metallic foil can be positioned on the inside facing the product and the plastics material can be on the outside. However, it should be appreciated that the package materials are not limited. However, other materials can be used including polymeric materials which may include thermoplastic materials such as polyethylene terephthalate (PET), for example. Depending on the types of materials used, the known wrappers can be used to form a fully sealed package which is substantially gas and moisture impervious. However, for some consumable product applications, a hermitically sealed package is not desirable. The exterior surface of package 15 can receive writing from a pen, pencil, or other writing utensil without smearing or smudging. Alternatively, only section 20 can be configured to receive the writing from a pen, pencil, etc.

Section 20 of the disclosed packaging provides a substrate on which a message may be written by a user. Thus, section 20 can be configured as part of the packaging film or can be provided as a separate portion of material positioned on a face of the package and connected to the packaging film. In some embodiments, the message section is permanently affixed to the package and cannot be removed, e.g., using adhesive.

Writable section 20 can be constructed from any suitable material, such as (but not limited to) paper, cardboard, fiberboard, carton board, chalk board, white board, and/or polymer based materials permanently adhered to the outer package surface. In other embodiments, the section can be constructed in line with the remainder of the packaging materials.

In some embodiments, section 20 can be bound on all sizes by a square, rectangle, etc. In some embodiments, the section includes a contrasting color and/or pattern when compared to the rest of the package.

Figure 3:
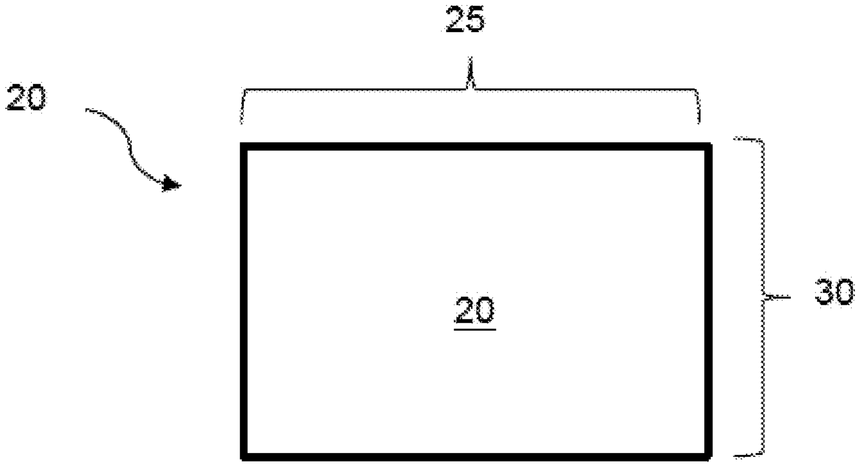
FIG. 3 is a top plan view of a package writing section in accordance with some embodiments of the presently disclosed subject matter.

Section 20 can have any suitable dimensions, as shown in FIG. 3. For example, the section can include length 25 and width 30 of about 1-25 inches or more. Thus, the length and/or width of section 20 can be at least about (or no more than about) 1, 5, 10, 15, 20, or 25 inches. The term "length" refers to the longest horizontal straight-line distance of the section. The term "width" refers to the longest vertical straight-line distance of the section. It should be appreciated that the length and width of section 20 are not limited and can be configured outside the given range.

Figure 4A:
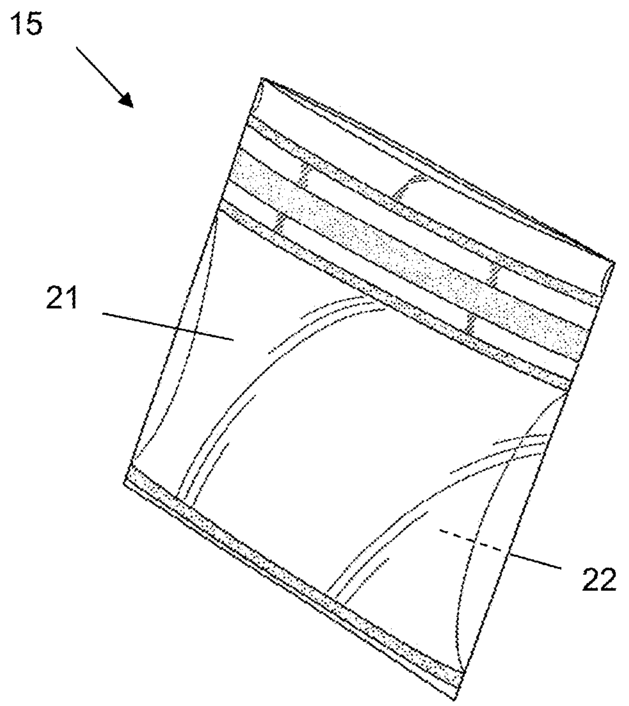
FIG. 4*a* is a perspective view of a package in accordance with some embodiments of the presently disclosed subject matter.
Figure 4B:
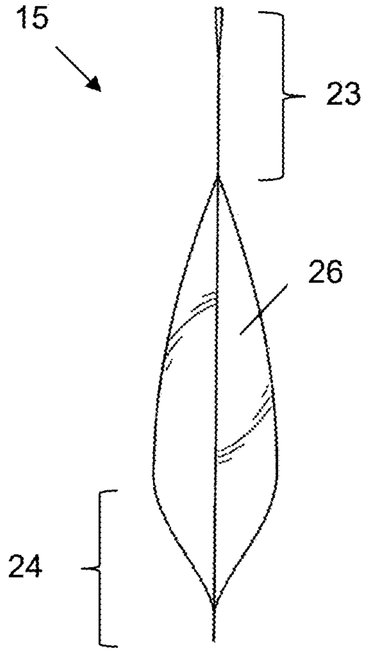
FIG. 4*b* is a side plan view of a package in accordance with some embodiments of the presently disclosed subject matter.
Figure 5A:
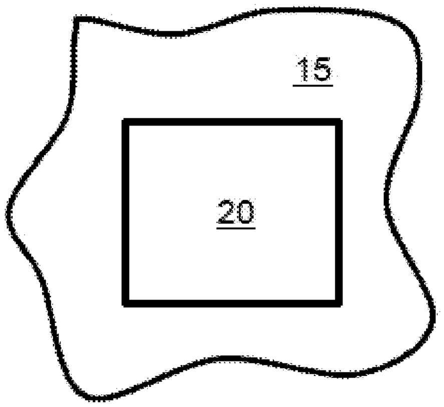
FIGS. 5*a*-5*d* are sectional views of package writing sections in accordance with some embodiments of the presently disclosed subject matter.
Figure 5B:
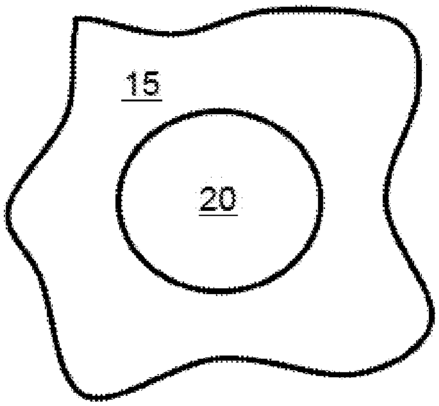
Figure 5C:
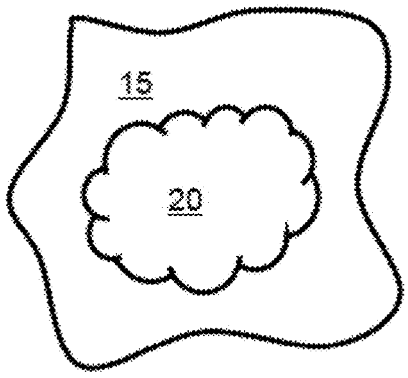
Figure 5D:
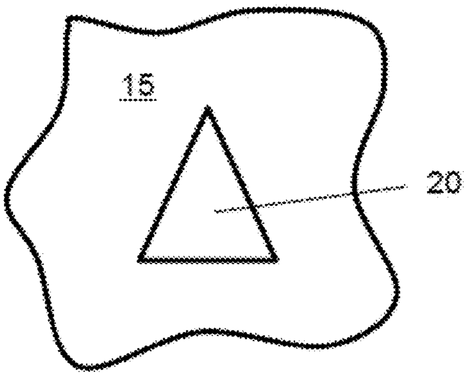

Package 15 can include any number of message sections 20. For example, in some embodiments, the package can include a single section 20 configured on front 21, back 22, top 23, bottom 24, or side 26 of the package. In some embodiments, section 20 can be positioned on more than one face (e.g., top, bottom, and back side). In still other embodiments, more than one message section can be included on each side. The term "front" refers to the direction of the receptacle closest to the user and intended to be viewed by the user, from the perspective of the user opening the package. The term "back" refers to the direction of the receptacle farthest to the user and intended not to be viewed by the user, from the perspective of the user opening the package (e.g., opposite to the front). The term "top" refers to the portion of the package that is located in the uppermost 30% of the overall height of the package, that is, from 70-100% of the overall height of the package or on a top face of the package (e.g., opposed to the bottom). The term "bottom" refers to the portion of the package that is located in the lowermost 30% of the overall height of the package, that is, from 0-30% of the overall height of the package or on a bottom (e.g., resting) face of the package. The term "side" refers to the package face between the front and rear faces, as shown in FIGS. 4*a* and 4*b*.

Message section 20 can be constructed in any desired shape as shown in FIGS. 5*a*-5*d*. For example, section 20 can be configured as a circle, oval, star, square, rectangle, triangle, heart-shape, cross shape, pentagon, hexagon, octagon, characters, animals, and the like. It should be appreciated that any shape can be used, including those of known cartoon characters, cars, planets, people, animals, sports emblems, and the like.

Figure 6A:
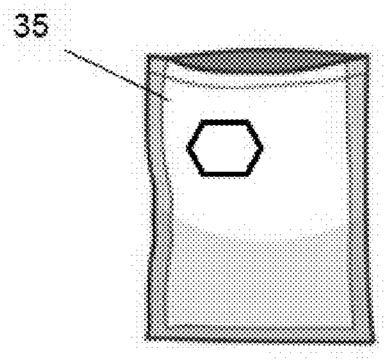
FIGS. 6*a*-6*c* are perspective views of packages in accordance with some embodiments of the presently disclosed subject matter.
Figure 6B:
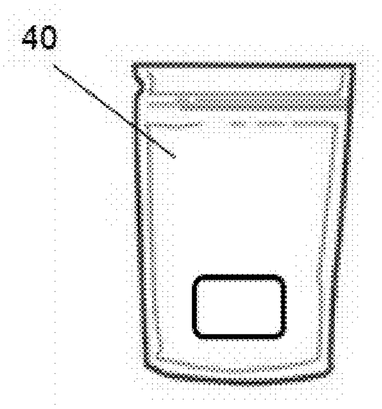
Figure 6C:
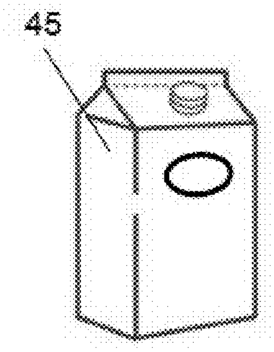

Any suitable method can be used to construct package 15. For example, a flow-wrap method can be used in which a film of material is supplied in a roll to package a number of products in a substantially continuous process. The material is fed through a machine that folds the film about each product in turn so that opposing side edges are brought into contact and bonded together to form the longitudinal seam, which usually extends along the rear face of the product. The material is crimped at either end of the product to form the end seams and the material is cut to separate each package from the remainder of the film. Alternatively, packaging of this nature may also be formed by envelope or sheet feeding and sealing effected by means of pressure and/or heat. However, the presently disclosed subject matter is not limited and the package can be constructed using any known method to be configured as bag 35, pouch 40, carton 45, and the like, as illustrated in FIGS. 6*a*-6*c*.

Figure 7A:
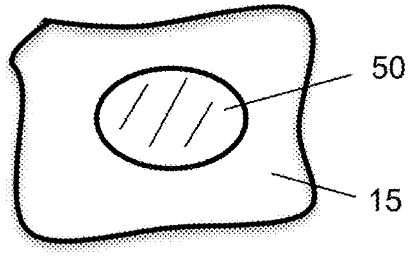
FIG. 7*a* is a sectional view of a package aperture in accordance with some embodiments of the presently disclosed subject matter.
Figure 7B:
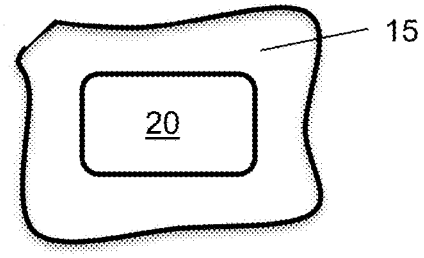
FIG. 7*b* is a sectional view of a package aperture covered with an adhesive writing section in accordance with some embodiments of the presently disclosed subject matter.
Figure 7C:
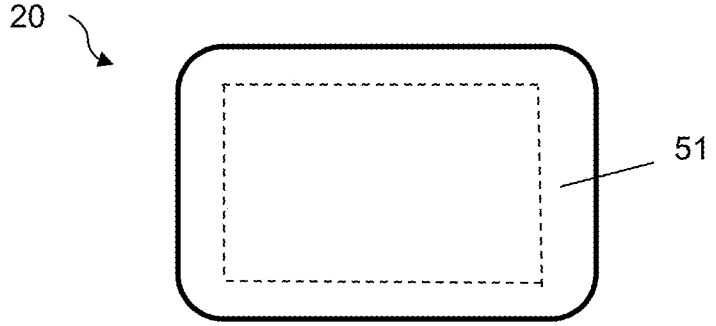
FIG. 7*c* is a top plan view of a writing section that includes adhesive in accordance with some embodiments of the presently disclosed subject matter.

In some embodiments, an aperture 50 can be cut in the packaging film at the desired location of section 20, as shown in FIG. 7*a*. The term "aperture" refers to any type of opening such as a slit, hole, gap, cleft, etc. Aperture 50 can be made using any conventional mechanism, such as the use of a cutting implement (e.g., razor, knife), laser cutting, and the like. Section 20 can be adhered over the aperture and held in place on the package, as shown in FIG. 7*b*. Thus, the section can include glue or other adhesive 51 at the outer perimeter that covers the aperture in the package and adheres around the aperture, closing the aperture, as shown in FIG. 7*c*.

Figure 8A:
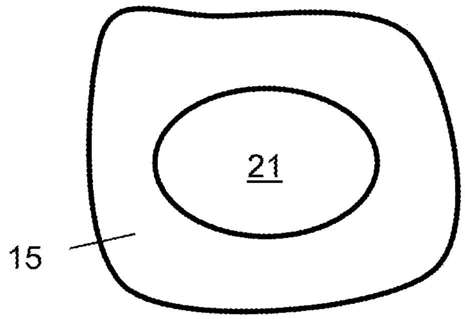
FIG. 8*a* is a sectional view of a writing section that includes an external protective covering in accordance with some embodiments of the presently disclosed subject matter.
Figure 8B:
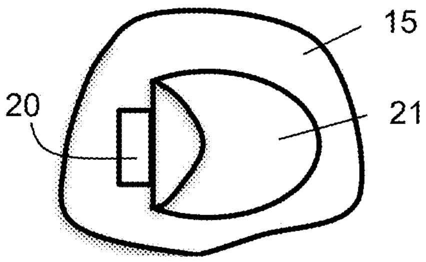
FIG. 8*b* is a sectional view of external protective covering being remove to expose a writing section.

In some embodiments, section 20 is accessible via an outer "peel-off" area 21 that reveals the blank section beneath, as shown in FIGS. 8*a* and 8*b*. The peel off section can serve to protect section 20, prevent any damage to the section prior to writing. The peel off section can be constructed from any suitable material.

Package 15 is particularly suited for packaging one or more food products. However, the package can be adapted for packaging any product, including non-food products. For example, note pads, erasers, napkins, plastic cutlery, and the like can be housed within the interior of package 15, as noted above.

Figure 9A:
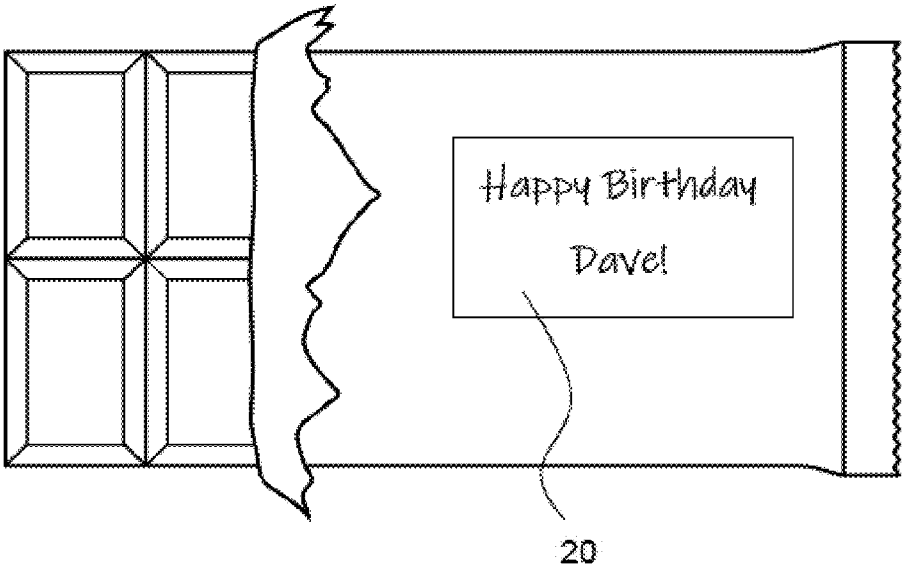
FIGS. 9*a* and 9*b* are top plan views of a package with a writing section in use in accordance with some embodiments of the presently disclosed subject matter.
Figure 9B:
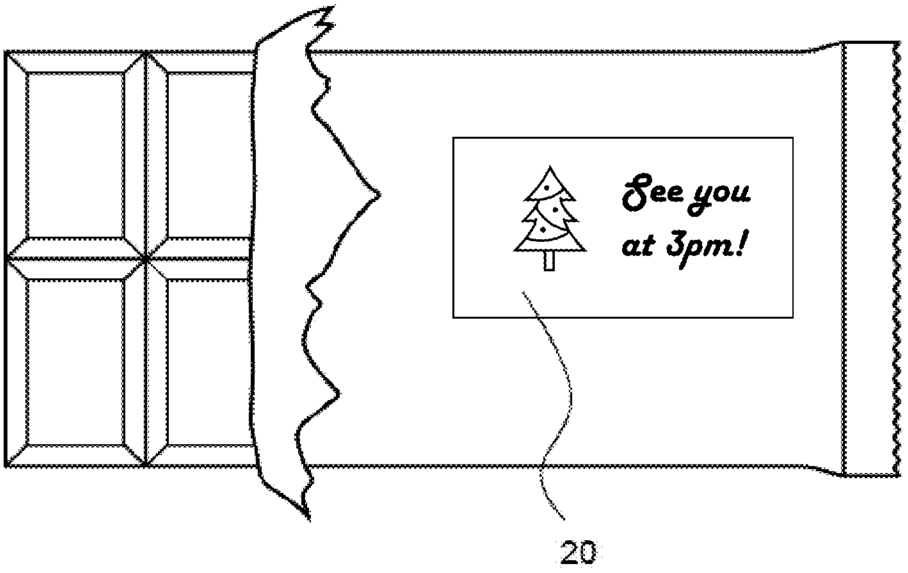

In use, a user can easily and efficiently add a message to package 15 by using a writing utensil such as a pen, highlighter, marker, pencil, chalk, etc. to freely draw or write within section 20. Thus, a user can write a note of encouragement, a reminder, a list, and the like onto the exterior of package 15. Any type of note or drawing can be included, as shown in FIGS. 9*a* and 9*b*. In some embodiments, section 20 can include a code, such as a QR code, bar code, RFID tag, etc. that allows a user to scan the code with a phone or other suitable device to read a personalized message from the sender. The encoded information is therefore capable of being read by a sensor or detector associated with the user opening the package. After the message has been added to section 20, the package can be given to an intended recipient (e.g., handed to a person, put in a child's lunchbox, etc.). The message is then read and enjoyed by the recipient.

In some embodiments, section 20 can include a pre-printed message or legend such as "Happy Birthday" or "Thank You" and/or may have a space in which a user can add the name of the intended recipient and/or a personalized message. A range of different messages can be produced, allowing a user to select a desired message for a particular occasion. The material forming the mark on the package, being contained within the sealed closure thereof, is not exposed to the product that is contained therein, nor to the quantity of product contained in the outer package. Thus, the message added to section 20 is not limited and can include poems, names, numbers, dates, drawings, images, and the like.

Figure 10:
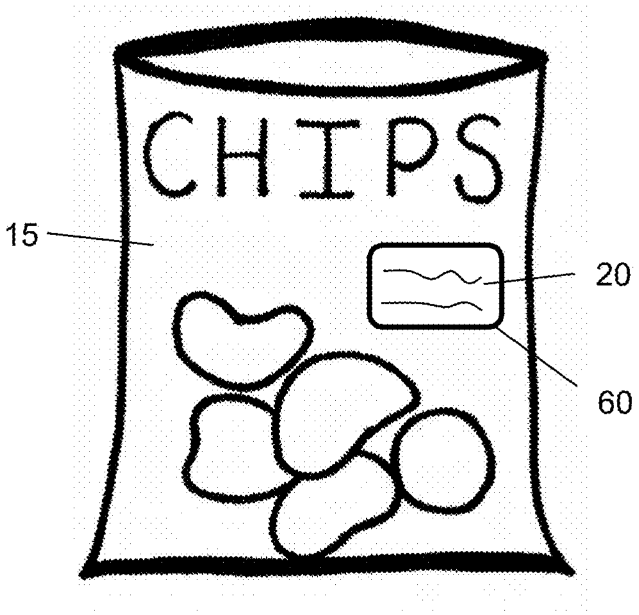
FIG. 10 is a front plan view of a package in accordance with some embodiments of the presently disclosed subject matter.

In some embodiments, section 20 can be removable and separated from the remainder of the package via a line of weakness or other frangible area 60, as shown in FIG. 10. In this way, a user can remove and save section 20 separate from package 15 easily and efficiently, if desired.

Package 15 provides many advantages over prior art packages. For example, if a user desires to leave a note on a conventional package, it must be separately written and affixed with glue or tape to an exterior surface of the package. The disclosed package saves time by allowing a user to write directly within section 20, without having to configure a separate note.

Package 15 also increases the chance that the recipient of the package sees the note since it cannot be lost or separated from the package.

The disclosed package allows a user to leave a note easily and efficiently for a recipient at any desired time.

In some embodiments, package 15 enables a user to customize a message to an intended recipient at any desired time.

The disclosed package is easy to use, such that even children or the elderly can leave a message directly onto package 15.

The disclosed package also acts as an identification system for distinguishing among individual packages (e.g., the item belongs to Person A).

Advantageously, the packaging is attractive to the user which can be especially beneficial when the product is a confectionery or other food product that may be given as a treat or gift and where the visual appearance of the packaging plays an important part in the overall experience for the end user.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A package comprising:

a front face and an opposed rear face each constructed from a packaging film that forms an exterior of the package and that defines an interior configured to house one or more packaged products;

wherein the packaging film includes two regions:

a writing section configured as a portion of the packaging film used to construct the package and positioned on a face of the package, the writing section constructed from paper, cardboard, fiberboard, carton board, chalk board, white board, or combinations thereof;

a remainder section surrounding the writing section and constructed from metal foil, polymeric material, or combinations thereof;

wherein the writing section is permanently integrated into the packaging film such that the writing section cannot be removed without the use of scissors, a knife, or other cutting utensil;

wherein the writing section is a material region distinct from the remainder section and is configured to allow a user to write or draw within the writing section and directly on the package; and wherein the writing section is formed from a first material and the remainder section is formed from a second material that is different from the first material.

2. The package of claim 1, wherein the package further includes an aperture that extends into the package interior with an additional writing section adhered over the aperture.

3. The package of claim 1, configured as a bag, pouch, cup, bottle, tube, snack cups, carton, or combinations thereof.

4. The package of claim 1, wherein all materials used to construct the package are food safe.

5. The package of claim 1, wherein the writing section has length, width, or both of about 1-25 inches.

6. The package of claim 1, comprising a plurality of writing sections, each surrounded by the remainder section.

7. The package of claim 1, wherein the package includes a removable covering positioned over the writing section.

8. A method of providing a customized message within a writing section of a package, the method comprising:

writing a desired message within the writing section of the package of claim 1;

delivering the package to an intended user, thereby providing a customized message to the intended user on the package.

9. The method of claim 8, wherein the package further includes an aperture that extends into the package interior with an additional writing section adhered over the aperture.

10. The method of claim 8, wherein the package is selected from a bag, pouch, cup, bottle, tube, snack cups, or carton.

11. The method of claim 8, wherein the writing is done with a pencil, pen, or chalk.

12. The method of claim 8, wherein the package includes a removable covering positioned over the writing section.

13. The package of claim 1, wherein the packaging film comprises a single layer of film.

14. The package of claim 1, wherein the writing section and the remainder section are separate material regions joined together to collectively define the packaging film.

15. The package of claim 1, wherein the writing section comprises a fibrous material configured to receive handwritten markings.

16. The package of claim 1, wherein the remainder section comprises a polymeric film and the writing section comprises a non-polymeric material.

17. The package of claim 1, wherein the writing section is configured to receive handwritten markings from graphite, ink, marker, or chalk.

18. The package of claim 1, wherein the writing section remains permanently integrated with the remainder section during normal use of the package.

19. The package of claim 1, wherein the writing section comprises a paper-based material and the remainder section comprises a polymeric film material.

20. The package of claim 1, wherein the writing section comprises cardboard, fiberboard, or carton board and the remainder section comprises metal foil, polymeric material, or combinations thereof.

* * * * *